(12) United States Patent
Hara

(10) Patent No.: US 6,332,190 B1
(45) Date of Patent: *Dec. 18, 2001

(54) BRANCH PREDICTION METHOD USING A PREDICTION TABLE INDEXED BY FETCH-BLOCK ADDRESS

(75) Inventor: Tetsuya Hara, Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/968,209

(22) Filed: Nov. 12, 1997

(30) Foreign Application Priority Data

May 30, 1997 (JP) .................................................. 9-142080

(51) Int. Cl.$^7$ ........................................................ G06F 9/00
(52) U.S. Cl. ......................... 712/240; 712/239; 711/100; 711/213
(58) Field of Search ................. 712/20–41, 204–213, 712/233–240, 205, 206; 711/100, 213

(56) References Cited

U.S. PATENT DOCUMENTS

| | | | |
|---|---|---|---|
| 5,327,536 | * | 7/1994 | Suzuki ................................. 712/238 |
| 5,574,871 | * | 11/1996 | Hoyt ................................... 712/200 |
| 5,774,710 | * | 6/1998 | Chung ................................. 712/238 |
| 5,794,028 | * | 8/1998 | Tran .................................... 712/240 |
| 5,822,575 | * | 10/1998 | Tran .................................... 712/239 |
| 5,822,576 | * | 10/1998 | Dinkjian et al. .................... 712/239 |
| 5,867,682 | * | 2/1999 | Witt et al. ........................... 712/210 |
| 5,948,100 | * | 9/1999 | Hsu et al. ............................ 712/238 |
| 5,974,542 | * | 10/1999 | Tran et al. .......................... 712/239 |

FOREIGN PATENT DOCUMENTS 2-144626   6/1990  (JP) .

OTHER PUBLICATIONS

Patterson, et al., "Computer Architecture a Quantitative Approach, 2nd Ed.", 1996, pp. 377–378.*

Seznec, Andre, et al., "ultiple–Block Ahead Branch Predictors", ACM, Inc., 116–127, Oct. 1996.*

Tse–Yu Yeh et al., "Alternative Implementations of Two–Level Adaptive Branch Prediction", 19$^{th}$ Int. Symp. on Computer Architecture, Jun. 1992, pp. 124–134.

* cited by examiner

*Primary Examiner*—John F. Niebling
*Assistant Examiner*—Stacey Whitmore
(74) *Attorney, Agent, or Firm*—Burns, Doane, Swecker & Mathis, LLP

(57) ABSTRACT

In branch prediction in a superscalar processor, a fetch block address is stored in a program counter (31) to make an access to a prediction table (32) not only when a branch instruction is predicted but also when an execution history (prediction information) of the branch instruction is registered or updated on the basis of the executed result of the branch instruction.

20 Claims, 13 Drawing Sheets

```
if(aa==2)       /* BRANCH 1 */
   aa=0;
if(bb==2)       /* BRANCH 2 */
   bb=0;
if(aa!=bb){     /* BRANCH 3 */
   .....
}
```

| TAG | ADDRESS IN FETCH BLOCK | PREDICTION INFORMATION OF BRANCH DIRECTION (BRANCH EXECUTION HISTORY) | BRANCH TARGET INFORMATION (BRANCH TARGET ADDRESS/ BRANCH TARGET INSTRUCTION) |
|---|---|---|---|

PC VALUE
(DISPLAYED IN DECIMAL)   INSTRUCTION

| 1544 | BR 5 |
|------|------|
| 1545 | BR 6 |
| 1546 | BR 7 |
| 1547 | I 2 2 |

FB4

FIG. 12
| PC VALUE (DISPLAYED IN DECIMAL) | INSTRUCTION | |
|---|---|---|
| 1540 | BR3 | |
| 1541 | I20 | FB3 |
| 1542 | BR4 | |
| 1543 | I21 | |
FIG. 13
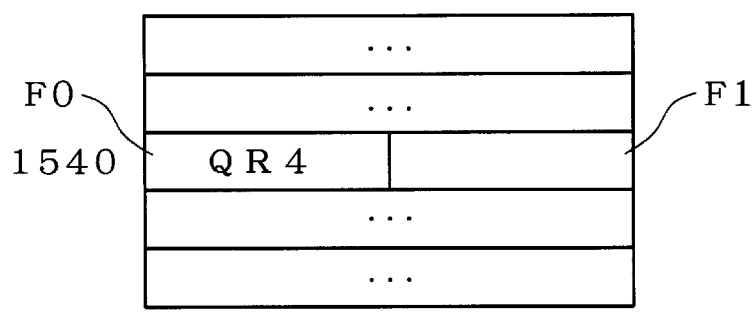
FIG. 14
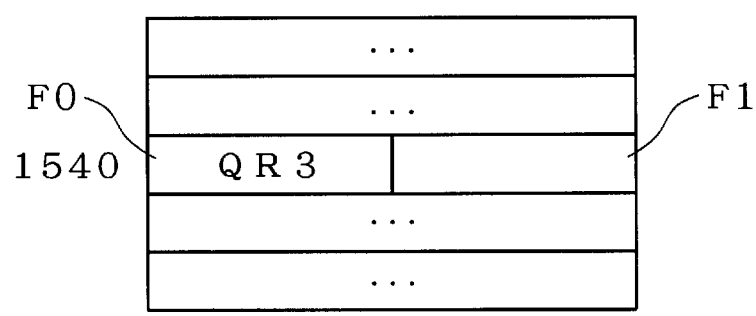

PREDICTION OUTCOME

| X000 | I0 | I1 | I2 | I3 |
| X100 | I4 | I5 | I6 | I7 |

BRANCH PREDICTION METHOD USING A PREDICTION TABLE INDEXED BY FETCH-BLOCK ADDRESS

BACKGROUND OF THE INVENTION

1. Field of the Invention

The present invention is directed to a processor which can prefetch a plurality of instructions, and especially directed to a branch prediction method in a superscalar processor.

2. Background of the Invention

A processor with a pipelined structure makes a prefetch of instructions for effective use of the pipeline. More specifically, an instruction to be executed after an instruction in execution, referred to as the next instruction, is predicted and fetched before its address is finally determined.

Sometimes, however, misprediction of the next instruction may occur especially immediately after a branch instruction. In that case, the next instruction which has already been set in the pipeline is made invalid, which degrades efficiency in the pipeline processing. Such irregularity in the pipeline due to the branches is becoming a great disadvantage in improving processor performance.

In a general scalar pipeline processor, a branch prediction method is introduced to improve prediction accuracy so that irregularity in the pipeline can be suppressed. One example is a method using a prediction table achieved by hardware to store information necessary for prediction for the next instruction.

The method includes two types: a branch history table (BHT) method for storing information only as to a branch direction (taken or not taken) such as a branch execution history; and a branch target buffer (BTB) method for storing information as to a branch target for a taken branch, such as a branch target address or a branch target instruction, as well as the above information.

FIG. 26 is a schematic diagram for explaining a branch prediction by the BTB method. An instruction cache 35 is accessed by a program counter value 31 (hereinafter referred to as a PC value, which is an address of an instruction to be cached) at an instruction fetch stage in the pipeline; at the same time, a prediction table 32 is retrieved by the PC value. If no entry corresponding to the PC value is present in the prediction table 32 and the fetched instruction is not a branch instruction, the PC value is normally incremented, for example, by 1 and the instruction is executed by an execution unit 37. Whether the fetched instruction is a branch instruction or not is determined by a decoder 36.

If no entry corresponding to the PC value is present in the prediction table 32 and the fetched instruction is a branch instruction, the execution history such as the branch target address and the branch direction is newly registered in an entry in the prediction table 32 specified by the address of the branch instruction.

If an entry corresponding to the PC value corresponding to the fetched instruction is present in the prediction table 32, the fetched instruction is determined to be a branch instruction. Thus, the branch direction is predicted on the basis of a branch direction information 322 in this entry. A prediction judging unit 33 controls operation of a selector 34, and outputs a target address 323 when the branch is predicted taken so that the target address is set in the program counter 31. When the branch is predicted not-taken, the PC value is normally incremented, for example, by 1, and the instruction is executed by the execution unit 37.

After the branch instruction is executed by the execution unit 37, a prediction table registration control unit 38 checks the executed result with the branch prediction of the prediction judging unit 33. When the prediction is incorrect, the PC value of the program counter 31 where the branch target address has already been set is made invalid to fetch the next instruction within the correct instruction stream. The prediction table registration control unit 38 also updates information in the prediction table 32 on the basis of the checked result.

Since the superscalar processor improves its performance by simultaneously issuing and executing a plurality of instructions, prefetch of instructions in the superscalar processor, compared to the scalar processor, would lead to more irregularity in the pipeline due to the branches.

The reasons are as follows: First, since complexity of logic deepens the pipeline, branch penalty caused by misprediction of the branches increases in the superscalar processor; Secondly, since a plurality of instructions are executed at the same time, the ratio of the number of cycles which stop in the pipeline due to parting of the instruction stream to the number of all cycles to be executed becomes larger. Therefore, the superscalar processor requires higher accuracy in branch prediction in comparison with the scalar processor.

SUMMARY OF THE INVENTION

A first aspect of the present invention is directed to a branch prediction method for predicting a branch direction of a branch instruction to be executed in a processor, in which a plurality of instructions constituting a fetch block are simultaneously fetched, by using a prediction table which includes an entry for storing a prediction information on the basis of the executed result of the branch instruction which has been previously executed. The branch prediction method comprises the steps of: (a) referring to the entry for the prediction information before a specific instruction serving as the branch instruction is executed, if the plurality of instructions fetched at the same time include at least one of the specific instruction, the entry being indexed by a fetch block address which is a head address of the fetch block including the specific instruction; and (b) storing the prediction information into the entry indexed by the fetch block address of the fetch block including the specific instruction, after the specific instruction is executed, on the basis of the executed result of the specific instruction.

Preferably, according to the branch prediction method of a second aspect of the present invention, the entry contains a plurality of fields in each of which the prediction information is stored.

Preferably, according to the branch prediction method of a third aspect of the present invention, the prediction information is stored in the plurality of fields in an order of addresses of the corresponding specific instructions, if the fetch block includes the plurality of specific instructions.

Preferably, according to the branch prediction method of a fourth aspect of the present invention, the prediction information indicating a higher probability that the branch will be taken is given priority for being stored in the entry, if the number of the specific instructions in a first of the fetch block is larger than the number of the plurality of fields in the entry.

A fifth aspect of the present invention is directed to a branch prediction method for predicting a branch direction of a branch instruction to be executed in a processor, in which a plurality of instructions constituting a fetch block are simultaneously fetched, by using a prediction table which includes an entry for storing a prediction information on the basis of the executed result of the branch instruction which has been previously executed. The branch prediction method comprises the steps of: (a) referring to the entry for the prediction information before a specific instruction serving as the branch instruction is executed, if the plurality of instructions fetched at the same time includes at least one of the specific instruction, the entry being indexed by a fetch block address which is a head address of the fetch block including the specific instruction and by an execution history of the branch instruction which has been executed previous to the specific instruction; and (b) storing the prediction information into the entry indexed by the fetch block address of the fetch block including the specific instruction and by the execution history of the branch instruction which has been executed previous to the specific instruction, after the specific instruction is executed, on the basis of the executed result of the specific instruction.

In accordance with the branch prediction method of the first aspect, the prediction information on the specific instruction serving as the branch instruction is referred to or stored in the entry by using the fetch block address of the fetch block including the specific instruction as an index, in register or update after execution of the specific instruction or in prediction before execution of the specific instruction. Thus, deterioration in prediction accuracy due to the fetched instructions not aligned, and complexity of hit check can be prevented. Further, if a plurality of different instruction streams have the same specific instruction, and the specific instruction is included in a different fetch block for each instruction stream, its prediction information is stored in a different entry for each instruction stream. This enables the branch correlation prediction.

In accordance with the branch prediction method of the second aspect, if one fetch block includes a plurality of specific instructions, the prediction information of the specific instructions are stored in the prediction table for every fetch block address. Thus, even a plurality of branch instructions included in a block of instructions fetched at the same time can be predicted.

If one fetch block includes a plurality of specific instructions predicted taken, it is desirable to predict that the branch target after execution of the fetch block will be the branch target of the specific instruction located at the smaller address. This is because, if the branch instruction at the smaller address is taken, there is less probability that other branch instructions in the same fetch block will be executed (i.e. the branch target instruction for the branch instruction at the smaller address is either of other branch instructions in the same fetch block). In accordance with the branch prediction method of the third aspect, the prediction information of the specific instruction at the smaller address can be found by the position of the field for storing the prediction information, helping quickly determine the branch target.

When the number of the specific instructions, predicted taken and included in the same fetch block, is larger than the number of the fields in the entry, the prediction information not to be stored in the entry needs to be determined. In accordance with the branch prediction method of the fourth aspect, the prediction information are stored in order in the fields on the basis of the probability that the branch will be taken, so that branch penalty can be suppressed.

In accordance with the fifth aspect, the branch prediction method employing the branch correlation prediction has the same effect as described in the method of the first aspect.

The present invention provides a technique for improving accuracy in the branch prediction in the superscalar processor.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 9 through 21 are schematic diagrams showing the branch prediction method according to the third preferred embodiment.

DESCRIPTION OF THE PREFERRED EMBODIMENTS

A. Preliminary Concept of the Present Invention

Before describing preferred embodiments of the present invention, we will first consider a case where a conventional prediction table method employed in a scalar processor is simply extended to a superscalar processor.

As a first preliminary concept, since the superscalar processor executes a plurality of instructions at the same time, it is considered that each address of all the fetched instructions may be used as an index to an entry in the prediction table. This method, however, requires a readout port in the prediction table for each of the instructions fetched at the same time, which complicates the prediction table. This reduces readout speed as well as increases cost of hardware for the prediction table.

As a second preliminary concept, a head address (hereinafter referred to as a fetch block address) out of a block of instructions fetched at the same time (hereinafter referred to as a fetch block) may be used as an index to make an access to the prediction table. In this method, one entry is read out for each fetch block.

Figures 26, 27:
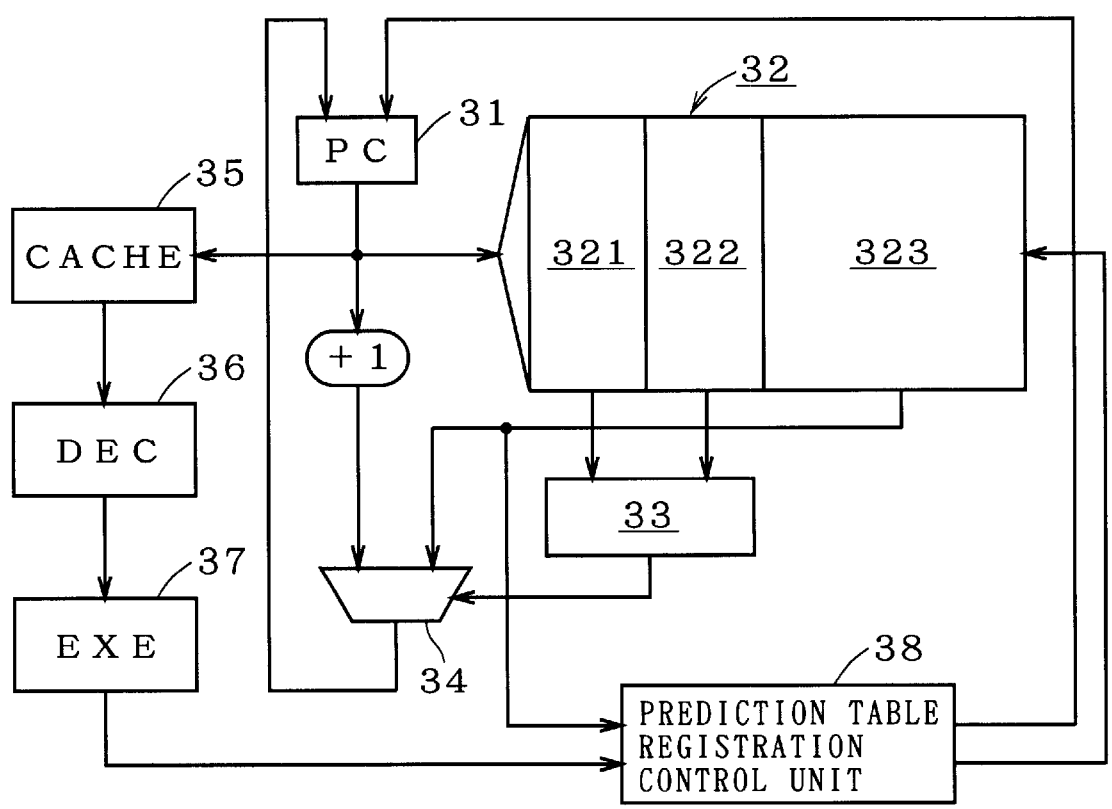
FIG. 26 is a schematic diagram for explaining the branch prediction by a BTB method.
FIGS. 27 through 30 are schematic diagrams showing a preliminary concept of the present invention.
Figure 28:
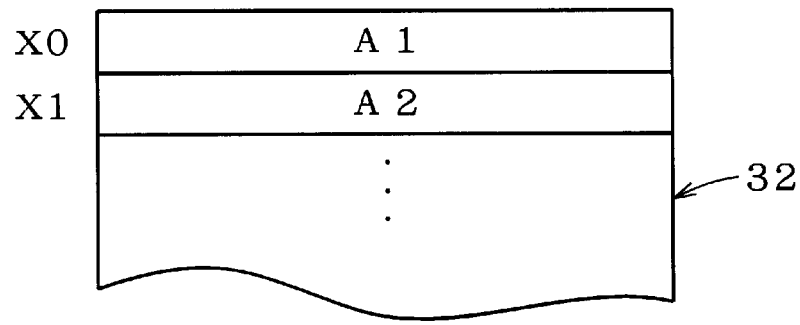

FIG. 27 shows addresses of instructions 10 through 17, and FIG. 28 shows indexes X0, X1 (X=0 or 1) and entries A1, A2 corresponding to the indexes in the prediction table 32. In FIG. 27, the lower 4 bits of the address for each of the instructions 10 through 17 are X000 through X111, respectively. Since four instructions are fetched at the same time, the lower 2 bits of the address X0, X1 can be used as an index to make an access to the prediction table 32 shown in FIG. 28. Corresponding to those addresses are the entries A1 and A2 shown in FIG. 28. When an execution history of a branch instruction is registered or updated, the address of the branch instruction (having the lower 4 bits of X000 through X111) is used to make an access to the prediction table so that information descriptions as to the instructions I0 through I3 and information descriptions as to the instructions I4 through I7 are stored in the entries A1 and A2, respectively.

Figure 29:
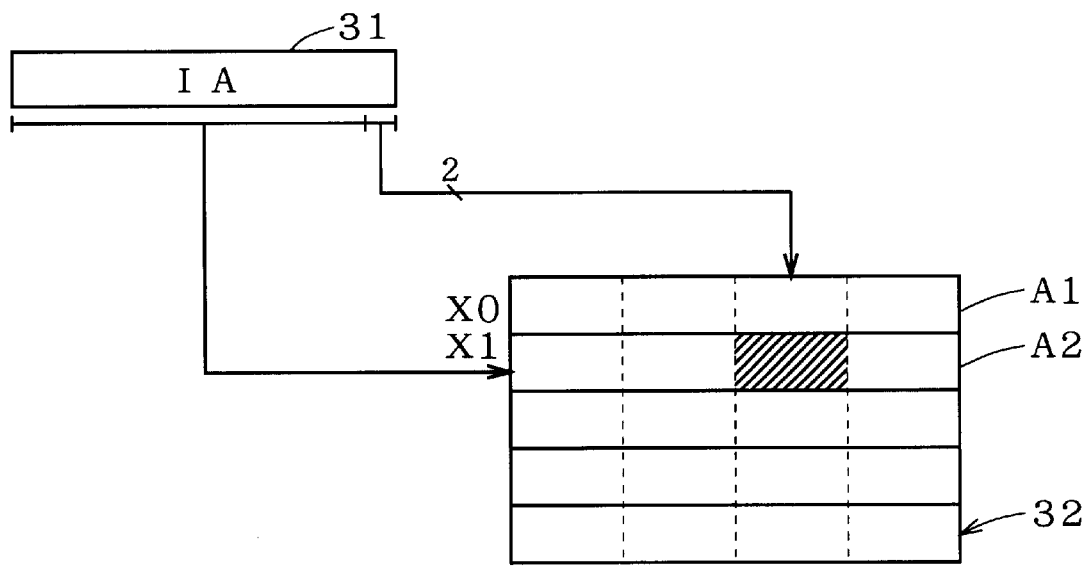

FIG. 29 illustrates an access to the prediction table when the execution history of the branch instruction is registered or updated. Arrows in FIG. 29 indicate how a field for storing the execution history is determined. An address IA of the branch instruction is stored in the program counter 31, and the execution history based on the executed result of the branch instruction is stored in the prediction table 32. In that case, the PC value except the lower 2 bits is used as an index, and the execution history of the branch instruction is stored in a certain bit of the entry specified by the lower 2 bits of the address. In FIG. 29, the execution history of the branch instruction I6 is stored in the shaded portion.

When the branch instruction is predicted, on the other hand, a fetch block address FBA except the lower 2 bits is used as an index. In a processor using a VLIW (Very Long Instruction Word) method, the relative relationship between the fetch block address and the branch instruction address is constant, so that its instruction stream has a relatively low degree of freedom. On the contrary, in the superscalar processor, the relative relationship between the fetch block address and the branch instruction address is not a one-to-one correspondence since the fetched instruction stream changes dynamically. Thus, the instruction stream in the superscalar processor has a relatively high degree of freedom, which implies that the lower 2 bits of the fetch block address is not always "00". That is, the four instructions fetched at the same time are not always aligned on a four-word boundary.

Figure 30:
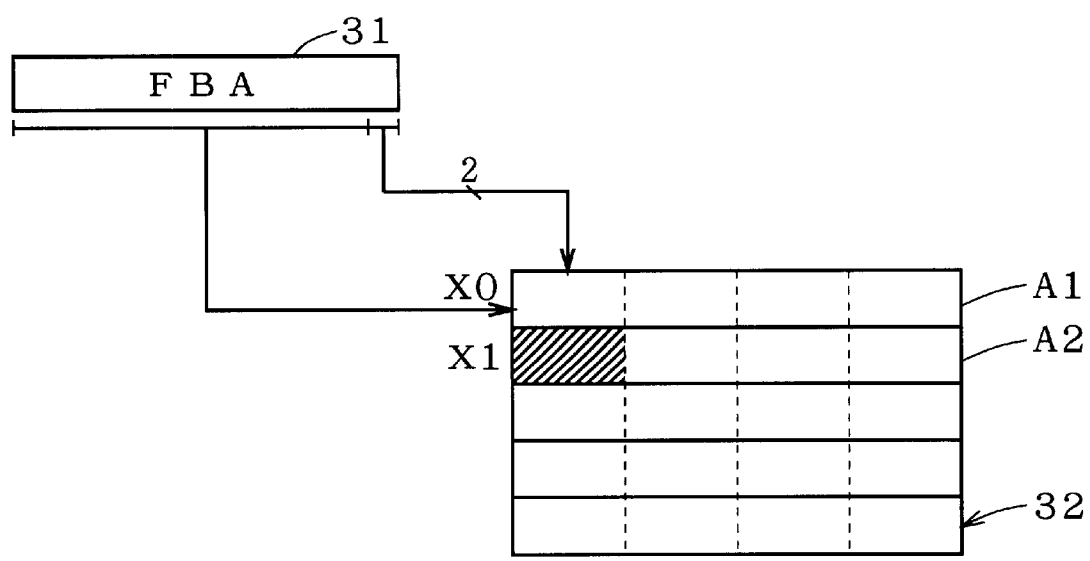

FIG. 30 illustrates an access to the prediction table 32 when the branch instruction is predicted. Arrows in FIG. 30 indicate how a field for storing the execution history is determined. When the four instructions I2 through I5 are fetched at the same time, for example, the address of the instruction I2 is used as the fetch block address. In this case, the lower 4 bits of the fetch block address FBA stored in the program counter 31 is "X010" and the lower 2 bits used as an index to the prediction table is "X0", so that the entry A1 is retrieved.

The entry A1, however, stores the information descriptions as to the instructions I0 through I3, so that the branch target address for the branch instruction I4 cannot be predicted. The information description as to the instruction I4 is stored in the entry A2 corresponding to the index with the lower 2 bits of "X1" (the shaded portion in the figure). Thus, the correct information cannot be obtained even by specifying a certain bit of the entry A1 by the lower 2 bits of the PC value. This implies that the fetched instructions not aligned on a four-word boundary degrades prediction accuracy.

On the contrary, the entry A1 may store the branch target information for the instruction I1 if the instruction is a branch instruction. In that case, information in the entry A1 cannot be totally relied upon in prediction. Thus, it is necessary to make a check whether the information description is the one to be referred or not, as well as a tag check which is normally necessary. This complicates a hit check.

The preferred embodiments of the present invention to be described below relies on a basic concept that the fetch block address of the fetch block including the branch instruction is used as an index to the prediction table not only in prediction but also in register or update of the execution history of the branch instruction. The structure shown in FIG. 26 is also employed in these preferred embodiments, but some preferred embodiments will propose improvements in the structure of the prediction table 32 as is described in detail later.

B. Preferred Embodiments

B-1. Basic Concept

Figure 1:
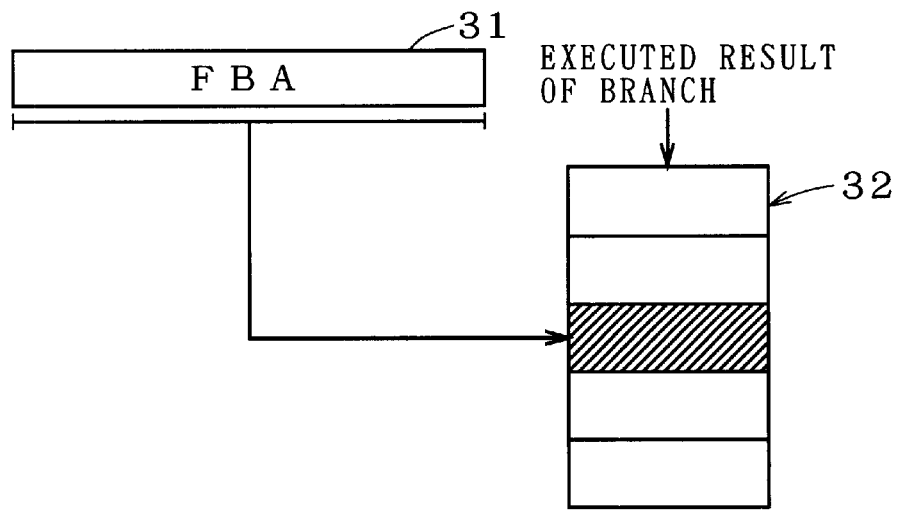
FIGS. 1 and 2 are schematic diagrams for explaining a basic concept of the present invention.
Figure 2:
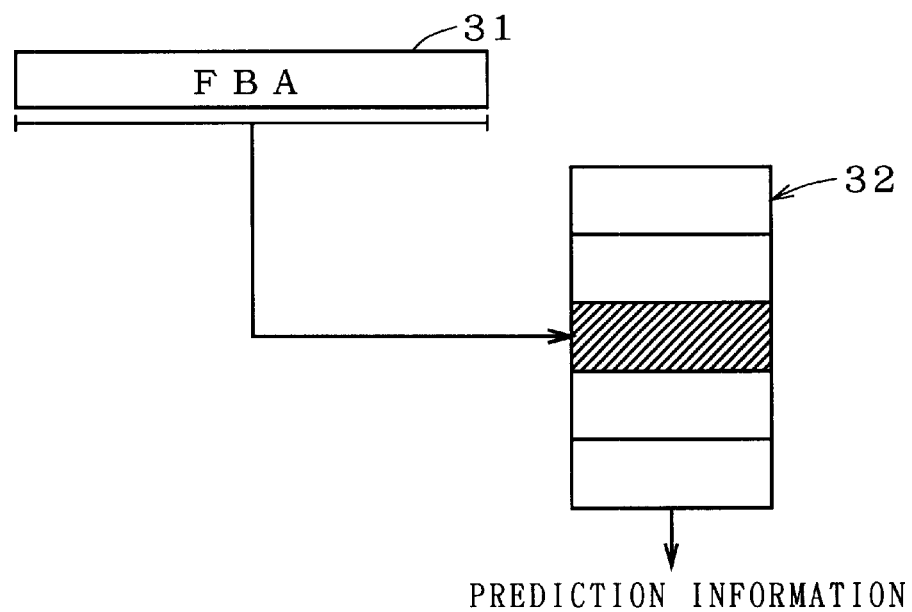

FIGS. 1 and 2 illustrate accesses to the prediction table when the execution history of the branch instruction is registered or updated, and when the outcome of the branch instruction is predicted, respectively. In both cases, the whole fetch block address FBA is used as an index to the prediction table. Since the same fetch block address is used both in register or update and in prediction, prediction accuracy is not degraded even if four instructions to be fetched at the same time are not aligned on a four-word boundary. Besides, there is no considerable increase in hardware necessary for the prediction table.

B-2. First Preferred Embodiment

Figure 3:
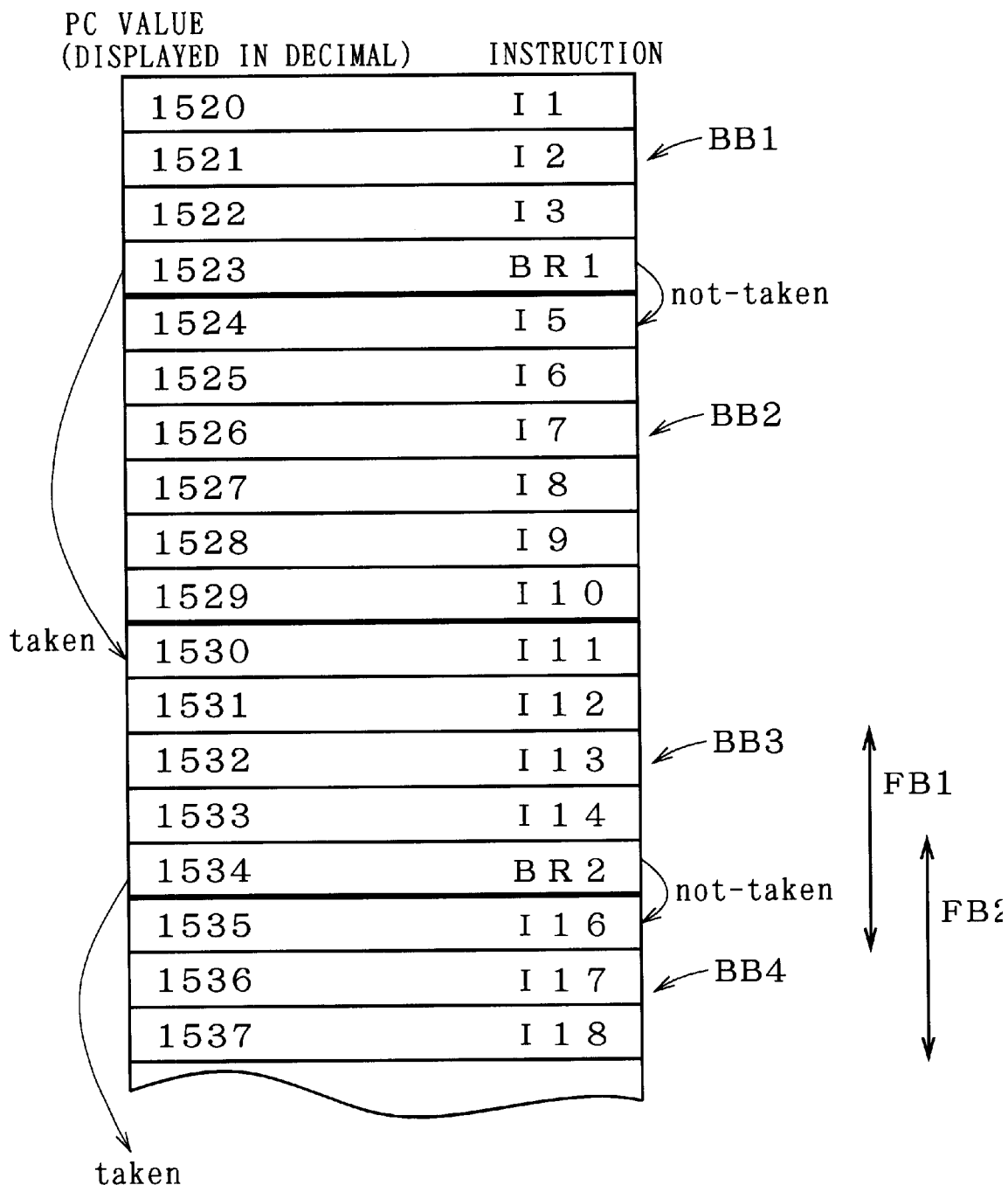
FIG. 3 is a schematic diagram showing a branch prediction method according to a first preferred embodiment of the present invention.

FIG. 3 schematically shows a branch prediction method according to a first preferred embodiment of the present invention. A plurality of consecutive PC values 1520 through 1537 are shown, corresponding to the instructions. Instructions BR1 and BR2 are branch instructions, and the other instructions I1 through I18 are non-branch instructions. The instructions I1 through I3 and BR1 constitute a basic block BB1 (PC values 1520 through 1523), the instructions I5 through I10 constitute a basic block BB2 (PC values 1524 through 1529), the instructions I11 through I14 and BR2 constitute a basic block BB3 (PC values 1530 through 1534), and the instructions I16 through I18 and later constitute a basic block BB4 (PC value 1535 and later).

If the branch instruction BR1 of the PC value 1523 is taken, the branch jumps to the instruction I11 of the PC value 1530, which is the head instruction of the basic block BB3; If not taken, the branch goes to the instruction I5 of the PC value 1524 incremented by 1 from the previous value, which is the head instruction of the basic block BB2. If the branch instruction BR2 of the PC value 1534 is taken, the branch jumps to an instruction in the basic block BB4 and later; If not taken, the branch goes to the instruction I16 of the PC value 1535 incremented by 1 from the previous value, which is the head instruction of the basic block BB4.

We will now consider the case where the basic block BB1 is executed and its end instruction (branch instruction BR1) is fetched. If the branch instruction BR1 is executed and not taken, the basic block BB2 will be next executed. Thus, the fetch block address changes in order of 1520, 1524, 1528, 1532, . . . in the superscalar processor in which four instructions are fetched at the same time. Since the branch instruction BR2 is fetched by the fetch block address 1532, a fetch block FB1 is formed of the four instructions I13, I14, BR2 and I16.

On the other hand, if the branch instruction BR1 is taken, the basic block BB3 will be next executed. Thus, the fetch block address changes in order of 1520, 1530, 1534, . . . Since the branch instruction BR2 is fetched by the fetch block address 1534, a fetch block FB2 is formed of the four instructions BR2, I16, I17 and I18.

Figures 4, 5, 6:
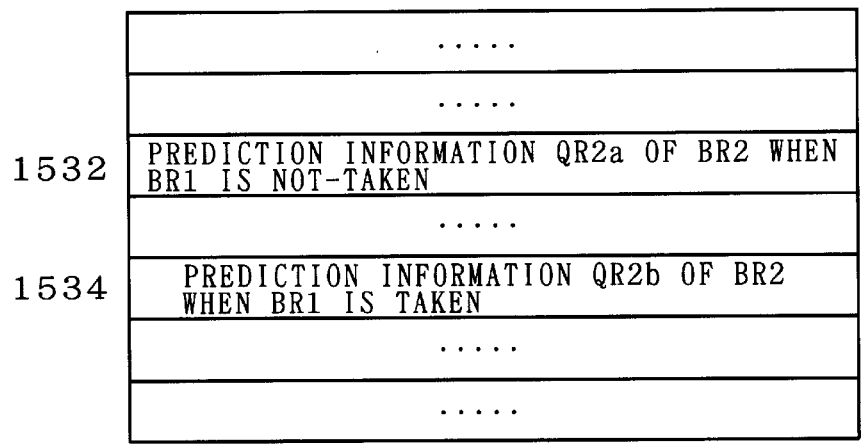
FIG. 4 schematically shows how a prediction information is stored in a prediction table 32.
FIG. 5 shows a program for explaining a method for branch correlation prediction.
FIG. 6 is a schematic diagram showing a modification of the branch prediction method according to the first preferred embodiment.

Here, it is noted that two types of the execution histories (or prediction information when predicted) for the branch instruction BR2 are stored in entries corresponding to different indexes. FIG. 4 shows that the two different types of the prediction information of the branch instruction BR2 are stored in the different entries in the prediction table 32. If the branch instruction BR1 executed previous to the branch instruction BR2 is not taken, the prediction information QR2a of the branch instruction BR2 is stored in the entry corresponding to the index 1532; if taken, the prediction information QR2b of the branch instruction BR2 is stored in the entry corresponding to the index 1534. That is, the prediction information can be separately stored in the superscalar processor for every instruction streams which change dynamically. This helps resolve the problem described in the preliminary concept of the present invention such as degradation in prediction accuracy and complexity of a hit check caused by a block of the fetched instructions not aligned on a four-word boundary.

Moreover, the first preferred embodiment achieves a method for branch correlation prediction. The method for branch correlation prediction, introduced by "T-Y. Yeh and Y. N. Patt, Alternative Implementation of Two-Level Adaptive Branch Prediction, In Proc, The 19th International Symposium on Computer Architecture, pp. 124–134, June 1992", uses as an index to the prediction table what the executed result (or branch direction) of the most recent branch instruction and the address of the branch instruction to be next executed are combined. This method gives attention to the point that the branch direction is related not only to its own history but also to the branch direction, or execution pass, of the branch instruction previously executed. The following description first presents a simple example of the method for branch correlation prediction, and then gives how this method can be achieved in the first preferred embodiment.

FIG. 5 shows a program, which is a part of eqntott of a SPEC integer benchmark, for explaining the method for branch correlation prediction. Suppose that a branch is taken when the condition is met, a branch 3 is always not taken if both branches 1 and 2 are taken. In this way, higher accuracy in prediction can be achieved by adding correlation information as to branches into the prediction table.

Referring back to the first preferred embodiment of the present invention, the prediction information QR2a of the branch instruction BR2 stored in the index 1532 is for the not-taken branch instruction BR1; the prediction information QR2b of the branch instruction BR2 stored in the index 1534 is for the taken branch instruction BR1. With the information stored in different indexes, branch prediction can be made depending on the execution pass of the instruction.

When the number of instructions in the basic block BB2 is a multiple of the number 4, the branch instruction BR2 is always included in the fetch block FB2 irrespective of the direction of the branch instruction BR1. Even in that case, it is obvious that the problem described in the preliminary concept of the present invention can be resolved.

As described above, according to the first preferred embodiment, prediction accuracy can be improved without further complexity of hardware. Sometimes two types of the prediction information of the branch instruction BR2 may be necessary depending on the direction of the branch instruction BR1, which may require increase in hardware for the prediction table. Even in that case, however, there is an advantage that the branch correlation prediction brings about considerably high accuracy in branch prediction.

However, if only the information as to the branch direction is registered in the prediction table, the branch target information required when the branch is taken must be obtained by other means. If the instruction fetched in the pipeline produces the branch target address only when decoded, it will be delayed to fetch the branch target instruction even if prediction for the branch direction is correct, causing branch penalty.

To avoid this, it is desirable to register the branch target information of the taken branch as well in the entry. FIG. 6 shows a detail of the information stored in one entry. Like the BTB method, the information including the branch target address or the branch target instruction is stored as well as the tag, the address in the fetch block, and the prediction information for the branch direction (or execution history). Thus, when the branch is predicted taken, the next instruction can be prefetched in accordance with the predicted branch target information, so that branch penalty can be reduced.

B-3. Second Preferred Embodiment

In a non-mathematical application program such as a business program, one of three to five instructions, on average, is a branch instruction. Thus, the probability that one fetch block includes a plurality of the branch instructions is not small in the superscalar processor in which four instructions are fetched at the same time. From this, it is desirable to simultaneously predict a plurality of branch instructions so that prediction accuracy is improved. Such prediction is, however, difficult if only one execution history of the branch instruction is stored in one entry in the prediction table.

Therefore, this preferred embodiment makes improvements in the prediction table of the first preferred embodiment by forming a plurality of fields in one entry in the prediction table so that a plurality of the prediction information of the branch instructions can be registered in one entry.

Figures 7, 8:
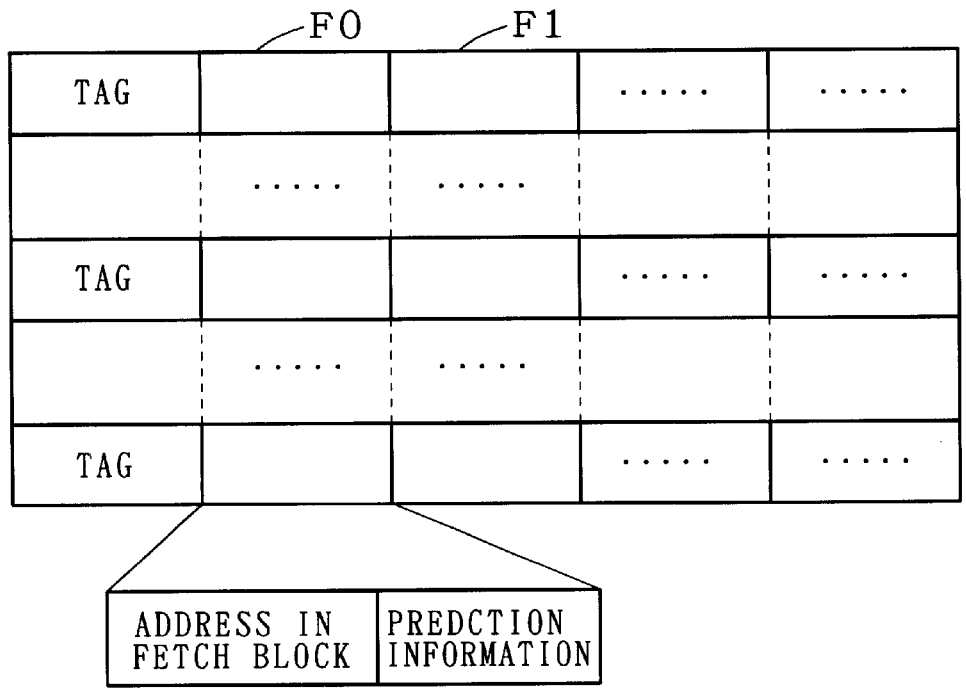
FIG. 7 is a schematic diagram showing a branch prediction method according to a second preferred embodiment of the present invention.
FIG. 8 is a schematic diagram showing a branch prediction method according to a third preferred embodiment of the present invention.

FIG. 7 shows a structure of the entry in the prediction table 32 according to a second preferred embodiment of the present invention. One entry contains a plurality of fields F0, F1, . . . in each of which the address in the fetch block and the prediction information are stored as a pair.

When the branch instruction is executed, the prediction information including the execution history such as the branch target address and the branch direction is registered or updated in the prediction table 32. The entry which stores the prediction information can be indexed by a head address of the fetch block including the executed branch instruction, i.e. the fetch block address. If a plurality of branch instructions are executed in this fetch block, the execution histories of those branch instructions are arbitrarily stored in the fields F0, F1, . . . Since their addresses in the fetch block are stored as well, the prediction information of the branch instructions can be stored in any field without confusion.

In branch prediction, the instruction cache 35 is accessed by the fetch block address at the instruction fetch stage, and at the same time, the prediction table 32 is indexed by the fetch block address. If an entry corresponding to this index is present in the prediction table, the prediction information in the entry is read out. If a plurality of fields in the entry store the prediction information, the address in the fetch block and the execution history are used to predict the branch direction.

As an example, we will now consider the case where the prediction information of two branch instructions are stored in the same entry. If both of the branch instructions are predicted not-taken, a block of instructions corresponding to the fetch block address of the PC value incremented by 4 is prefetched in order to fetch the next instruction (not-taken prediction). If either of the predicted branch instructions is taken, the branch target instruction for the taken branch instruction becomes the next instruction. If both predicted branch instructions are taken, the branch target instruction for the branch instruction located at the smaller address than the other becomes the next instruction. This is because, when the branch instruction at the smaller address is taken, there is less probability that the other branch instruction will be executed (the branch target instruction for the branch instruction at the smaller address is the other branch instruction in the same fetch block). The determination can be made in the prediction judging unit 33.

After the branch instruction is executed, the executed result is checked with the outcome of the prediction. If the prediction is incorrect, the PC value of the program counter 31 where the branch target address has already been set is made invalid so that the next instruction within the correct instruction stream can be fetched. Further, the information in the prediction table 32 is updated by the prediction table registration control unit 38 on the basis of the checked result.

As the number of the fields increases, the capacity necessary for the prediction table increases. However, according to this preferred embodiment, it is possible to predict a plurality of branches without any further complexity of the decoder or the like.

B-4. Third Preferred Embodiment

The general procedure for the branch prediction is access to the prediction table; branch prediction on the basis of the prediction information in the prediction table; and setting of the next instruction. To minimize branch penalty, the procedure needs to be performed in one cycle (a period in which each stage in the pipeline is prescribed). Since the prediction table is generally achieved by a memory and requires long time to be accessed, the process after readout of the prediction information must be as short as possible. Otherwise, the process for the branch prediction is likely to be a critical pass, increasing a cycle time of the processor.

In the second preferred embodiment, when two branch instructions included in the same fetch block are both predicted taken, it is necessary to decide that the branch target instruction for the branch instruction located at the smaller address be the next branch instruction. That is, a large or small comparison of addresses in the fetch block between the branch instructions is necessary, so that the processing time may be increased.

FIG. 8 schematically shows a fetch block FB4 consisting of four instructions BR5, BR6, BR7 and I22. The PC values of these instructions are 1544 through 1547 in this order. The instructions BR5 through BR7 are branch instructions; the instruction I22 is not.

Figure 9:
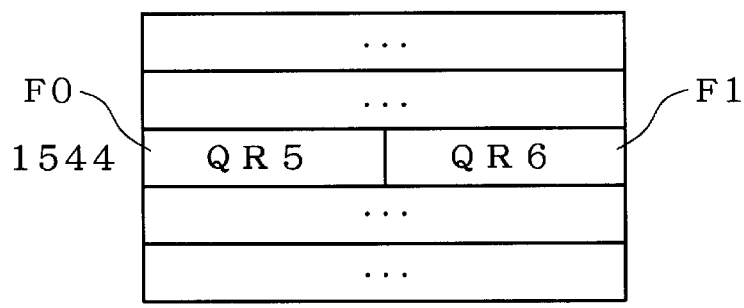

FIG. 9 shows that, in a prediction table with each entry having two fields, the prediction information QR5, QR6 of the branch instructions BR5, BR6 are stored in the fields F0 and F1, respectively, in the entry corresponding to the index 1544.

Figure 10:
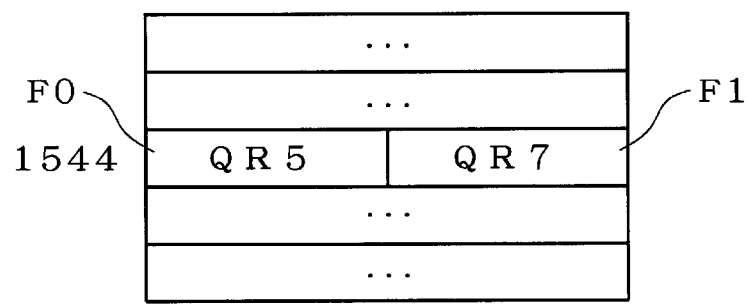
Figure 11:
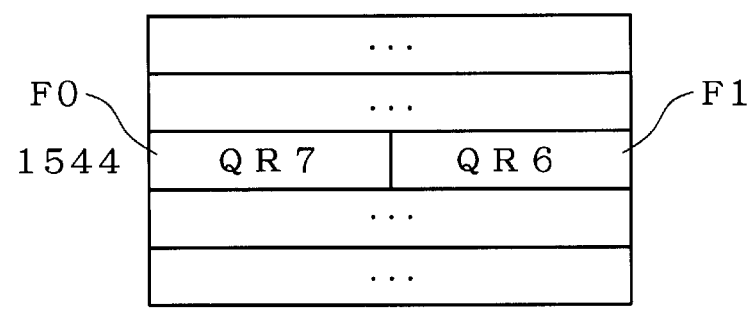

If the prediction information QR7 of the branch instruction BR7 is stored in the same entry in this situation, either of the fields F0 or F1 needs to store this information. If the prediction information QR7 is stored in the field F1, the prediction information QR6 is lost as shown in FIG. 10; if the prediction information QR7 is stored in the field F0, the prediction information QR5 is lost as shown in FIG. 11. In both cases shown in FIGS. 10 and 11, the order of the addresses of the branch instructions aligned in the plurality of fields is reverse. Thus, if the branch instructions BR5 through BR7 are all predicted taken, it is necessary to decide that the branch target instruction for the branch instruction at the smaller address be the next instruction.

Such problem arises even if one entry contains fields for the number of the branch instructions included in one fetch block. FIG. 12 shows a fetch block FB3 consisting of instructions BR3, I20, BR4 and I21. The PC values of these instructions are 1540 through 1543 in this order. The instructions BR3 and BR4 are branch instructions; the instructions I20 and I21 are not.

Figure 15:
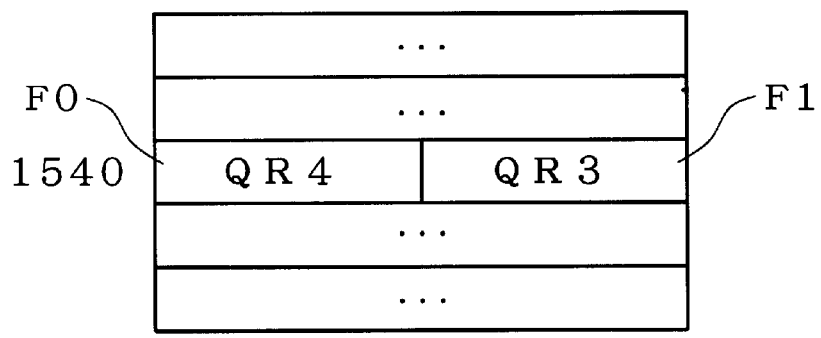

FIG. 13 shows that, in the prediction table with each entry having two fields, the prediction information QR4 of the branch instruction BR4 is stored in the field F0 in the entry corresponding to the index 1540. If the prediction information QR3 of the branch instruction BR3 is stored in the same entry in this situation, either of the fields F0 or F1 needs to store this information. If the prediction information QR3 is stored in the field F0 as shown in FIG. 14, the prediction for the plurality of the branch instructions becomes impossible; if the prediction information QR3 is stored in the field F1 as shown in FIG. 15, a large or small comparison of the addresses in the fetch block between the branch instructions becomes necessary. That is, even if the entry contains the fields for the number of the branch instructions included in the same fetch block, the above-described problem cannot be resolved.

According to this preferred embodiment, if two branch instructions in the same fetch block are both predicted taken, the order of preference of the branch instructions is determined not by a large or small comparison of the addresses in the fetch block but by the position of the field. This shortens the processing time.

Figure 16:
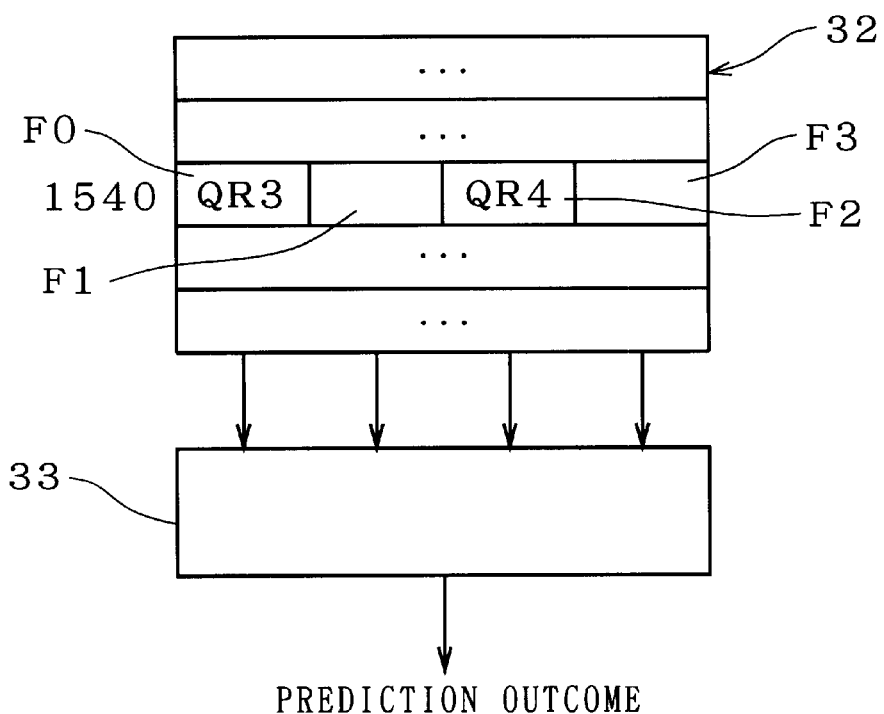

FIG. 16 shows that, when the fetch block FB3 including two branch instructions BR3 and BR4 is executed, the prediction information QR3, QR4 of the branch instructions BR3, BR4 are stored in the prediction table 32 with each entry having four fields F0 through F3. As shown in this figure, when two branch instructions BR3 and BR4 are included in the same fetch block FB3, the prediction information of those branch instructions are stored in the same entry corresponding to the index 1540.

According to this preferred embodiment, the prediction information of the branch instruction located at the smaller address is stored in the lower numbered field. For example, the prediction information QR3 of the branch instruction BR3 of the PC value 1540 is stored in the field F0; the prediction information QR4 of the branch instruction BR4 of the PC value 1542 is stored in the field F2.

Referring to frequency of appearance of the branch instructions, there is a fair possibility that a plurality of branch instructions are included in one fetch block in the superscalar processor in which four instructions are fetched at the same time, but there is few possibility that all the four instructions are branch instructions. Thus, it is not necessary to have four fields in each entry in the prediction table. However, to reduce the number of fields, it is desirable to use a storage algorithm in register or update of the prediction information, as shown in FIGS. 17 through 21. As an example, we will consider the case where the entry corresponding to the index 1544, which contains the two fields F0 and F1, corresponds to the fetch block FB4 including three branch instructions BR5 through BR7 (c.f. FIG. 8), and the prediction information QR5 through QR7 of the branch instructions BR5 through BR7 are stored in the entry.

Figure 17:
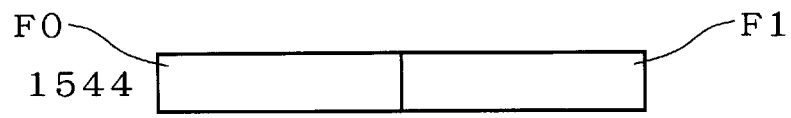
Figure 18:
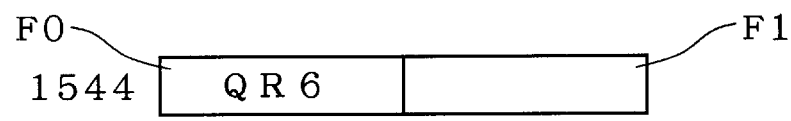

① When both fields are not occupied:

the prediction information is stored in the lower numbered field in the entry. When both of the fields F0 and F1 are not occupied as shown in FIG. 17, the prediction information QR6 is stored in the field F0 as shown in FIG. 18.

② When the prediction information of the same branch instruction is updated:

the update is performed in the field where the prediction information has been stored. If the prediction information QR6 which has been stored in the field F0 is to be updated by execution of the branch instruction BR6, the update is performed in the field F0 as shown in FIG. 18.

Figure 19:

③ When one of the fields is not occupied, and the prediction information of the branch instruction is registered, the branch instruction being located at the larger address than the branch instruction whose prediction information has been stored in the other field:

the prediction information of the branch information is stored in the non-occupied and higher-numbered field than the field where the prediction information of other branch instruction has been stored. As shown in FIG. 18, the prediction information QR6 of the branch instruction BR6 at the PC value 1545 has been stored in the field F0. Thus, the prediction information QR7 of the branch information BR7 at the PC value 1546 is stored in the non-occupied field F1 as shown in FIG. 19.

Figure 20:

④ When one of the fields is not occupied, and the prediction information of the branch instruction is registered, the branch instruction being located at the smaller address than the branch instruction whose prediction information has been stored in the other field:

the prediction information which has been stored in the field is shifted to the non-occupied and higher-numbered field. Then, the prediction information of the executed branch instruction is stored in the evacuated field. As shown in FIG. 18, the prediction information QR6 of the branch instruction BR6 at the PC value 1545 is stored in the field F0. Thus, as shown in FIG. 20, the prediction information QR6 is shifted to the field F1; the prediction information QR5 of the branch instruction BR5 at the PC value 1544 is stored in the field F0.

Figure 21:

⑤ When both fields are occupied, and the prediction information of the newly executed branch instruction is registered:

a plurality of prediction information to be stored for a plurality of branch instructions are selected by the number of the fields. The selected prediction information are stored in the fields from the lower numbered field in ascending order of the addresses of the corresponding branch instructions. For example, if the prediction information QR7 is to be stored in the situation shown in FIG. 20, the prediction information QR7 and either of the prediction information QR5 or QR6 are stored in the entry. In this case, the prediction information QR6 and QR7 may be selected as shown in FIG. 19; the prediction information QR5 and QR7 may be selected as shown in FIG. 21. In both cases, the order of the prediction information stored in the fields is determined by the addresses of the corresponding branch instructions.

Being registered or updated in this way, the prediction information stored in the lower numbered field is given priority in branch prediction. Since a large or small comparison of addresses in the fetch block is unnecessary, the next instruction can be quickly prefetched at the instruction fetch stage.

Of course, a considerable time may be necessary to store the prediction information in the order of priority for a plurality of branch instructions. However, unlike in prediction, there is very little probability in register or update that the time necessary to store the prediction information will be a critical pass causing extension of the cycle time in the pipeline. This is because the prediction information of the same branch instruction is rarely referred to next. Thus, update of the prediction information of the branch instruction can be delayed until the prediction information of the same branch instruction is accessed, so that there is little influence on the pipeline processing.

As described above, the position of the field indicates the order of priority in prediction according to this preferred embodiment. This eliminates the need for a large or small comparison of addresses in the fetch block, and achieves a high-speed branch prediction for a plurality of the branch instructions included in one fetch block.

B-5. Fourth Preferred Embodiment

The order of addresses of the branch instructions does not correspond to the order of the probability that the predicted branch instruction is taken. According to the second preferred embodiment, when two branch instructions, first and second branch instructions, are both predicted taken, the branch target instruction for the first branch instruction is decided to be the next instruction because the second branch instruction is rarely executed after execution of the first branch instruction. However, this is not related to the outcome of the branch prediction for the second branch instruction. The reason is because: the former is determined not by the prediction information stored in the entry but by the prediction judging unit 33 when both of the first and second branch instructions are predicted taken, while the latter is just obtained by the prediction information stored in the field corresponding to the second branch instruction.

Therefore, if the prediction information is stored in the entry only in ascending order of addresses of the branch instructions, prediction penalty might be increased. Thus, the prediction information, predicting a higher probability that the branch instruction will be taken, is kept in the entry according to this preferred embodiment.

In the processing ⑤ described in the third preferred embodiment, if the branch instruction BR7 is executed in the entry shown in FIG. 20, for example, how the executed result should be handled is determined on the basis of the probability that the branch instruction will be taken. If the branch instruction BR7 is executed and taken, the probability of the branch instruction BR7 being taken will be a 1 because the execution history of the branch instruction BR7 within the executed instruction stream is not present in the prediction table. Thus, the prediction information QR7 is newly registered.

In that case, either of the prediction information QR5 or QR6, predicting less probability that the branch instruction will be taken, is deleted from the entry. If the prediction information QR5 predicts less probability that the branch instruction will be taken, the entry will be occupied as shown in FIG. 19; if the prediction information QR6 predicts less probability that the branch instruction will be taken, the entry will be occupied as shown in FIG. 21.

On the other hand, if the branch instruction BR7 is executed and not taken, the probability of the branch instruction BR7 being taken will be a 0 because the execution history of the branch instruction BR7 is not present in the prediction table. Thus, the prediction information QR7 is not registered, and the entry shown in FIG. 20 does not change.

As described above, according to this preferred embodiment, the prediction information is stored in order in the fields on the basis of the probability of the branch instruction being taken as well, so that branch penalty can be suppressed.

Moreover, sometimes the prediction information should not be stored in the entry even if predicting a high probability that the branch instruction will be taken. For example, consider the case where the prediction information is stored in the entry as shown in FIG. 20. If the probability of the branch instruction BR7 being executed is considerably small, branch penalty would hardly increase even if the prediction information for the taken branch instruction BR7 is not stored in the prediction table. If the probability of the branch instructions BR5 or BR6 being taken is extremely high, the branch instruction BR7 is rarely executed. Thus, it is hardly worth storing the prediction information QR7 in the entry, even if the probability of the branch instruction BR7 being taken is considered to be a 1 from the executed results and is larger than the probability of the branch instructions BR5 and BR6 being taken.

B-6. Fifth Preferred Embodiment

If the superscalar processor employs the method for branch correlation prediction described in the first preferred embodiment in register or update of the information, with the address of the branch instruction as an index to the entry in the prediction table, the problem set forth in the preliminary concept of the present invention, such as deterioration in prediction accuracy caused by the fetched instructions not aligned, or complexity of hit check, cannot be resolved.

Figure 22:
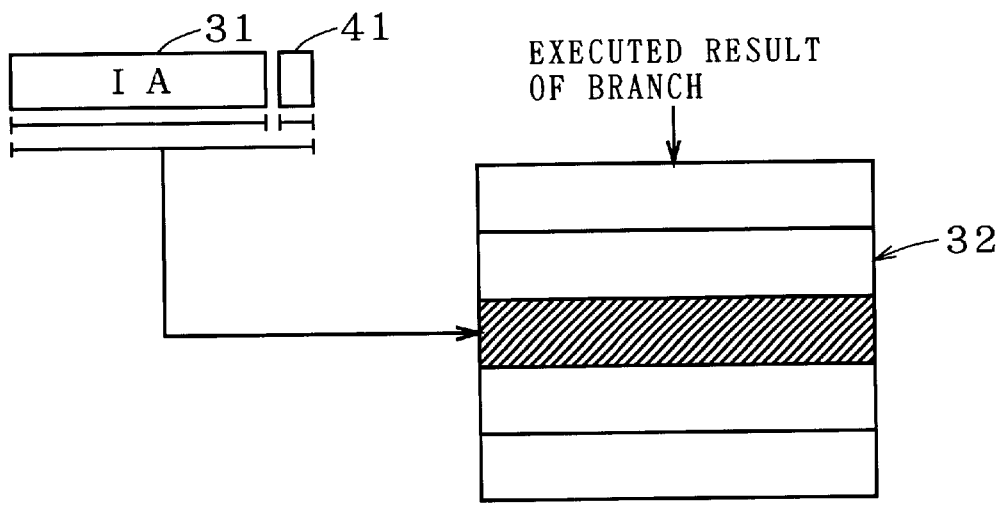
FIGS. 22 through 25 are schematic diagrams showing the branch prediction method according to a fifth preferred embodiment.
Figure 23:
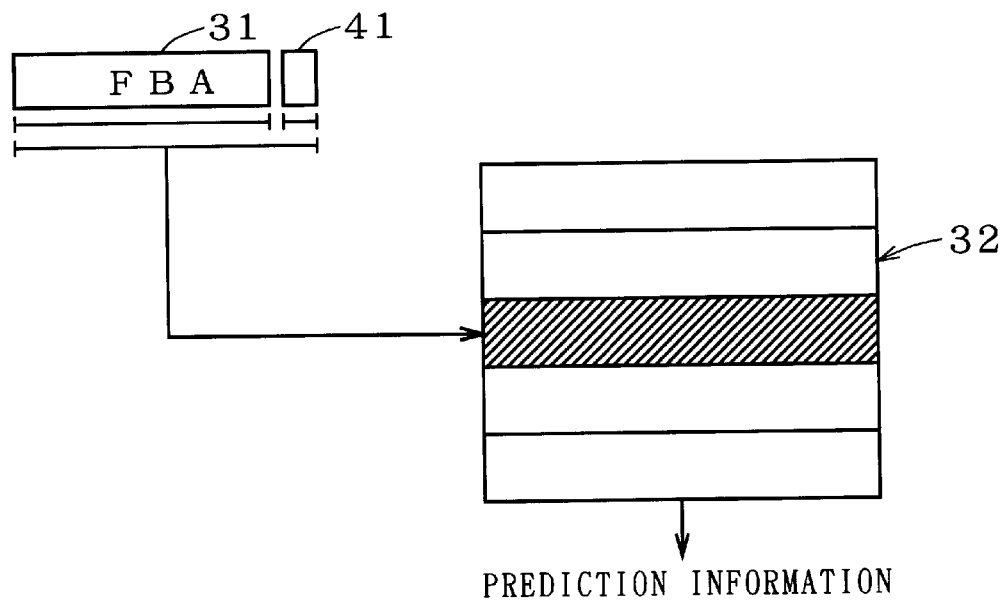

FIG. 22 illustrates an access to the prediction table 32 when the execution history of the branch instruction is registered or updated. An address IA of the branch instruction is stored in the program counter 31, and is used as an index along with the execution history 41 of the other branch instruction previously executed. The executed result of the branch instruction is registered or updated in the entry corresponding to this index. FIG. 23 illustrates an access to the prediction table 32 when the branch instruction is predicted. A fetch block address FBA of the fetch block including the branch instruction is stored in the program counter 31, and is used as an index along with the execution history 41 of the other branch instruction previously executed. The prediction table is retrieved by this index. However, since different indexes are used in register or update and in prediction, the problem set forth above cannot be resolved.

Figure 24:
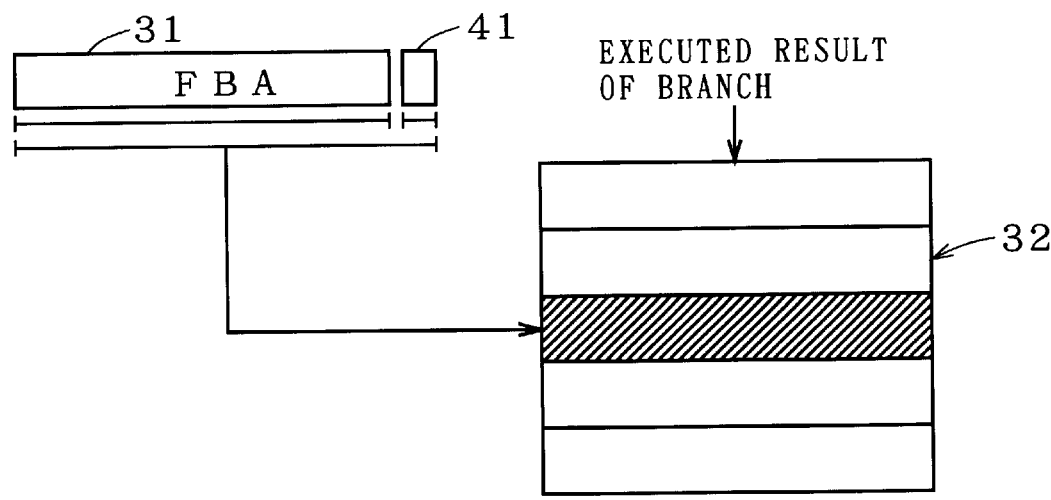
Figure 25:
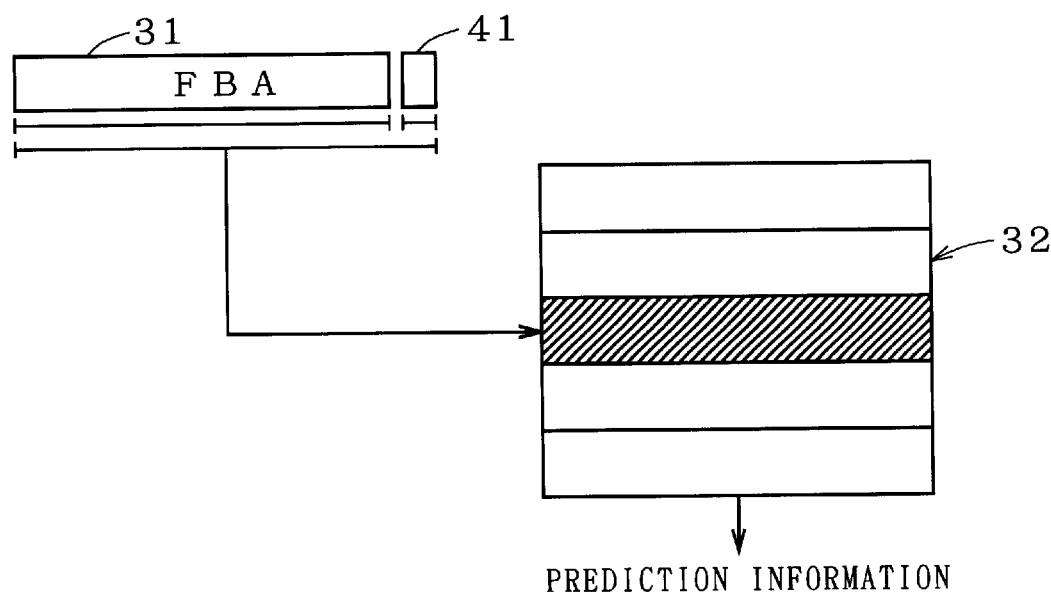

According to this preferred embodiment, the concept of the first preferred embodiment is introduced to the method for branch correlation prediction. FIG. 24 illustrates an access to the prediction table 32 when the execution history of the branch instruction is registered or updated. The fetch block address FBA of the executed branch instruction is stored in the program counter 31, and used as an index along with the execution history 41 of the other branch instruction previously executed. The executed result of the branch instruction is stored or updated in the entry corresponding to this index. FIG. 25 illustrates an access to the prediction table 32 when the branch instruction is predicted. The fetch block address FBA of the fetch block including the branch instruction is stored in the program counter 31, and is used as an index along with the execution history 41 of the other branch instruction previously executed. The prediction table is retrieved by this index. Since the same index is used both in register or update and in prediction, deterioration in prediction accuracy caused by the fetched instructions not aligned, or complexity of hit check can be prevented as is the case with the first preferred embodiment.

It is of course possible in this case to provide a plurality of fields in one entry and register the prediction information in the plurality of fields in order, as described in the second and fourth preferred embodiments of the present invention.

While the invention has been described in detail, the foregoing description is in all aspects illustrative and not restrictive. It is understood that numerous other modifications and variations can be devised without departing from the scope of the invention.

I claim:

1. A branch prediction method for predicting a branch direction of a first branch instruction to be executed in a processor, by using a prediction table which includes a plurality of entries for storing prediction information about executed results of branch instructions, including said first branch instruction, which have been previously executed, wherein a fetch block includes a plurality of instructions, including said first branch instruction, where said instructions are simultaneously fetched, said branch prediction method comprising the steps of:
(a) referring to one of said entries for said prediction information before a first instruction serving as said first branch instruction is executed, if said instructions include said first instruction, said one entry being indexed by a full fetch block address which is a head address of said fetch block including said first instruction; and
(b) storing said prediction information in said one entry indexed by said full fetch block address of said fetch block, after said first instruction is executed, in the form of a result from the execution of said first instruction.

2. The branch prediction method as set forth in claim 1, wherein
said processor includes a superscalar processor.

3. The branch prediction method as set forth in claim 1, wherein
at least one of said entries contains a plurality of fields in each of which a prediction table registration control unit stores said prediction information.

4. The branch prediction method as set forth in claim 3, if a specific entry, which is one of said entries, stores a plurality of prediction information, said step (a) comprising the step of:
(a-1) predicting a branch target when said fetch block corresponding to said one entry is executed, if said first prediction information and said second prediction information both indicate that a branch will be taken, on the basis of said first prediction information located at a first address which is smaller than a second address storing said second prediction information; wherein said branch target predicted in said step (a-1) is fetched as a next instruction.

5. The branch prediction method as set forth in claim 4, said step (a) further comprising the step of:
(a-2) predicting a branch target when said fetch block corresponding to said one entry is executed, on the basis of one of said first prediction information and said second prediction information, if only said first prediction information indicates that said branch will be taken and said second prediction information indicates that said branch will not be taken; wherein said branch target predicted in said step (a-2) is fetched as a next instruction.

6. The branch prediction method as set forth in claim 5, said step (a) further comprising the step of:
(a-3) predicting that said branch will not be taken when said fetch block corresponding to said one entry is executed, if said first prediction information and said second prediction information indicate that said branch will not be taken.

7. The branch prediction method as set forth in claim 3, wherein said prediction table registration control unit stores said prediction information in said plurality of fields in an order of addresses of said corresponding instructions, if said fetch block includes said plurality of corresponding instructions.

8. The branch prediction method as set forth in claim 7, wherein said prediction table registration control unit shifts said prediction information in said plurality of fields in accordance with the order of addresses of said corresponding instructions.

9. The branch prediction method as set forth in claim 7, wherein
said prediction table registration control unit stores said prediction information indicating a higher probability that a branch will be taken with precedence over other prediction information, if the number of said instructions in said fetch block is larger than the number of said plurality of fields in said one entry.

10. A branch prediction method for predicting a branch direction of a first branch instruction to be executed in a processor, by using a prediction table which includes a plurality of entries for storing prediction information about executed results of branch instructions, including said first branch instruction, which have been previously executed, wherein a fetch block includes a plurality of instructions, including said first branch instruction, where said instructions are simultaneously fetched,
said branch prediction method comprising the steps of:
(a) referring to one of said entries for said prediction information before a specific instruction serving as said first branch instruction is executed, if said plurality of instructions of said fetch block includes said specific instruction, said one entry being indexed by a full fetch block address which is a head address of said fetch block along with an execution history of said first branch instruction which has been executed prior to said specific instruction; and
(b) storing said prediction information into said entries indexed by said full fetch block address of said fetch block along with said execution history of said branch instruction which has been executed previous to said specific instruction, after said specific instruction is executed, on the basis of a result of said specific instruction after execution.

11. The branch prediction method as set forth in claim 10, wherein
said processor includes a superscalar processor.

12. The branch prediction method as set forth in claim 10, wherein
at least one of said entries contains a plurality of fields in each of which a prediction table registration control unit stores said prediction information.

13. The branch prediction method as set forth in claim 12, if a specific entry, which is one of said entries, stores a plurality of prediction information, said step (a) comprising the step of:
(a-1) predicting a branch target when said fetch block corresponding to said one entry is executed, if said first prediction information and said second prediction information both indicate that a branch will be taken, on the basis of said first prediction information located at a first address which is smaller than a second address storing said second prediction information; wherein said branch target predicted in said step (a-1) is fetched as a next instruction.

14. The branch prediction method as set forth in claim 13, said step (a) further comprising the step of:
(a-2) predicting a branch target when said fetch block corresponding to said on entry is executed, on the basis of one of said first prediction information and said second prediction information, if only said first prediction information indicates that said branch will be taken and said second prediction information indicates that said branch will not be taken; wherein said branch target predicted in said step (a-2) is fetched as a next instruction.

15. The branch prediction method as set forth in claim 14, said step (a) further comprising the step of:
(a-3) predicting that said branch will not be taken when said fetch block corresponding to said one entry is executed, if said first prediction information and said second prediction information indicate that said branch will not be taken.

16. The branch prediction method as set forth in claim 12, wherein said prediction table registration control unit stores said prediction information in said plurality of fields in ascending order of addresses of said corresponding instruction, if said fetch block includes said plurality of corresponding instructions.

17. The branch prediction method as set forth in claim 16, wherein said prediction table registration control unit shifts said prediction information in said plurality of fields in accordance with the order of addresses of said corresponding instructions.

18. The branch prediction method as set forth in claim 16, wherein said prediction table registration control unit stores said prediction information indicating a higher probability that said branch will be taken with precedence over other prediction information, if the number of said instructions in said fetch block is larger than the number of said plurality of fields in said one entry.

19. A branch prediction method for predicting a branch direction of a first branch instruction to be executed in a processor, by using a prediction table which includes a plurality of entries, each entry having a plurality of fields, for storing prediction information about executed results of branch instructions, including said first branch instruction, which have been previously executed, wherein a fetch block includes a plurality of instructions, including said first branch instruction, where said instructions are simultaneously fetched,
said branch prediction method comprising the steps of:
(a) referring to one of said entries for said prediction information before a first instruction, serving as said first branch instruction, is executed, if said plurality of instructions include said first instruction, said one entry being indexed by a full fetch block address which is a head address of said fetch block including said first instruction; and
(b) storing said prediction information in said one entry indexed by said full fetch block address of said fetch block, after said first instruction is executed, in the form of a result from the execution of said first instruction,
wherein when said plurality of instructions of said fetch block includes a second branch instruction, said one entry contains prediction information for said second branch instruction in at least one of said fields.

20. The branch prediction method as set forth in claim 19, wherein said one entry stores first prediction information and second prediction information in said fields, said step (a) comprising the step of:
(a-1) predicting a branch target when said fetch block corresponding to said one entry is executed, if said first prediction information and said second prediction information both indicate that a branch will be taken, on the basis of said first prediction information located at a first address which is smaller than a second address storing said second prediction information; wherein said branch target predicted in said step (a-1) is fetched as a next instruction.

* * * * *